United States Patent [19]

Orita et al.

[11] Patent Number: 4,682,365

[45] Date of Patent: Jul. 21, 1987

[54] SYSTEM AND METHOD FOR PREPARING A RECOGNITION DICTIONARY

[75] Inventors: Miyahiko Orita; Yoshiki Kobayashi; Tadaaki Mishima, all of Hitachi, Japan

[73] Assignee: Hitachi, Ltd., Tokyo, Japan

[21] Appl. No.: 742,559

[22] Filed: Jun. 7, 1985

[30] Foreign Application Priority Data

Jun. 8, 1984 [JP] Japan .................................. 59-116462

[51] Int. Cl.⁴ .............................................. G06K 9/68
[52] U.S. Cl. ......................................... 382/14; 382/37
[58] Field of Search ........................ 382/14, 15, 36, 37

[56] References Cited

U.S. PATENT DOCUMENTS 3,588,823 6/1971 Chow et al. ........................... 382/15
4,499,596 2/1985 Casey et al. ........................... 382/15

OTHER PUBLICATIONS

Agin et al, "SRI Vision Research for Advanced Industrial Automation", Artificial Intelligence Center, Stanford Research In. 1975, pp. 113-117.

Primary Examiner—Leo H. Boudreau
Attorney, Agent, or Firm—Antonelli, Terry & Wands

[57] ABSTRACT

For the preparation of a tree structure recognition dictionary, in order to obtain the best decision tree, the maximum depth or the sum of the depths should be taken into account. For this purpose, there is provided a system and method for preparing a recognition dictionary which makes it possible to shorten both the maximum recognition time and the total recognition time by successively allocating to nodes of the decision tree features, for which a feature evaluation measure called "maximum estimated depth" for reducing the maximum depth or "sum of estimated node numbers" for reducing the sum of the depths is the smallest.

7 Claims, 21 Drawing Figures

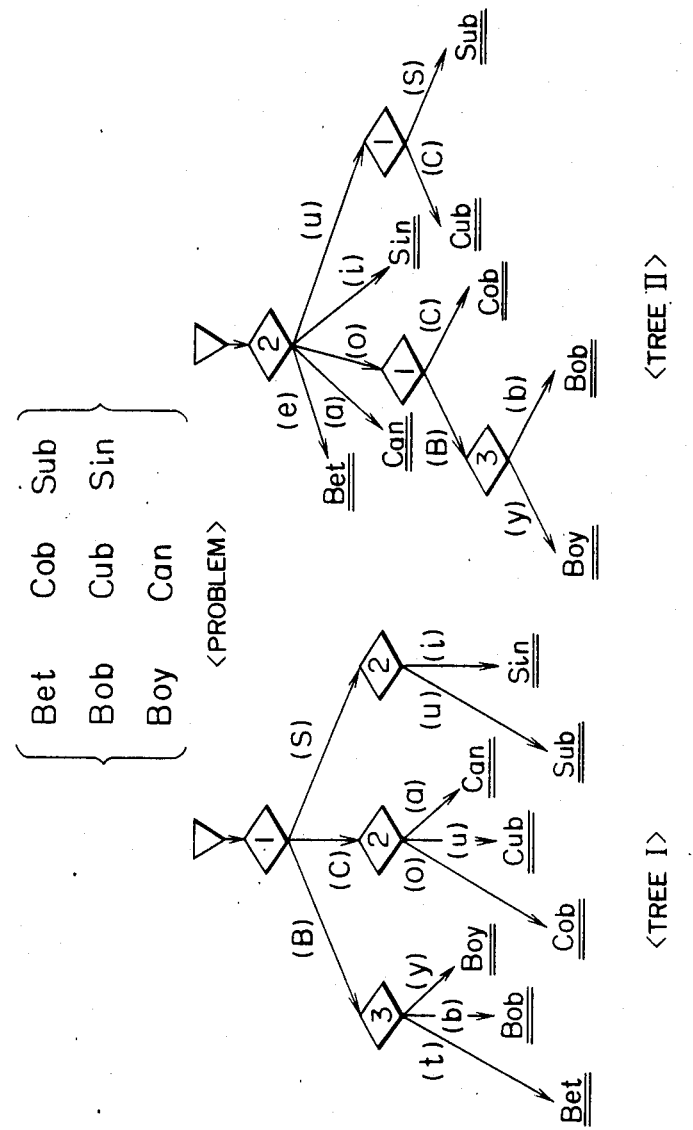

FIG. 3
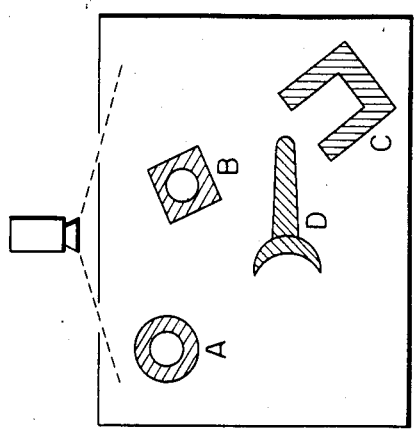
② EXAMPLE, WHERE THE MAXIMUM RECOGNITION TIME IS TAKEN INTO ACCOUNT
TO KNOW POSITION OF OBJECTS LOCATED AT RANDOM
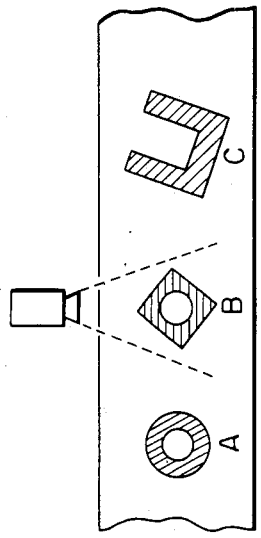
① EXAMPLE, WHERE THE MAXIMUM RECOGNITION TIME IS TAKEN INTO ACCOUNT
TO RECOGNIZE OBJECTS DISPOSED ON MOVING CONVEYOR ONE AFTER ANOTHER

| FEATURE | $X_1$ --- | $X_i$ | ---- $X_n$ |
|---|---|---|---|
| MAXIMUM ESTIMATED DEPTH | 4 --- | 3 | ---- 5 |
| SUM OF ESTIMATED NODE NUMBERS | 24 --- | 22 | ---- 30 |

SYSTEM AND METHOD FOR PREPARING A RECOGNITION DICTIONARY

BACKGROUND OF THE INVENTION

1. Field of the Invention

This invention relates to the automatic preparation of a recognition dictionary or a decision tree, which is inevitable for classification or search in the process of image recognition, and more specifically to a system for preparing a recognition dictionary, which is suitable for simplifying the operation of information recognition systems (e.g. image recognition systems) and for realizing high speed on-line information recognition, and a method therefor.

2. DESCRIPTION OF THE PRIOR ART

In general, in image recognition, objects to be recognized are identified on the basis of a recognition dictionary previously prepared. The recognition dictionary is prepared by analyzing the distribution data on various feature axes after having extracted several times various features for each of the objects to be recognized (hereinbelow called categories).

At this time, in order to simplify the analysis and to exclude the subject of the analyser, it is desirable to prepare automatically a recognition dictionary by a standardized method. As the structure of recognition dictionaries, decision tree structures, by which an importance is attached to the processing speed of recognition, are most widely utilized.

As prior art concerning the classification by use of a tree structure there is known "SRI VISION RESEARCH FOR ADVANCED INDUSTRIAL AUTOMATION" by Gerald J. AGIN and Richard O. DUDA, Second USA-JAPAN Computer Conference, 1975.

However, it was not possible to obtain any satisfactory recognition speed by the methods for preparing decision tree dictionaries, which have been heretofore proposed. For example, there is known a method by which a plurality of categories is divided into 2 classes on a feature axis, where the separability (variance of adjacent two categories) is the largest and similar classifications are repeated for each of new classes consisting of a plurality of categories after a preceding classification. This method utilizing the separability is described e.g. in "Oyo gazo kaiseki (Applied image analysis) (by Jumpei Tsubouchi, Kyoritsu Shuppan Co. Ltd.). This method will be explained, referring to FIG. 1. Suppose now that category groups, which are to be classified (identified), are $C_a$–$C_d$ and that features prepared for them are $F_1$–$F_3$. The frequency distribution concerning a feature $F_1$ of a plurality of samples or objects contained in a category $C_a$, i.e. the mean value $\mu_a$ and the standard deviation $\sigma_a$, can be obtained. The mean value and the standard deviation of the other categories $C_f$–$C_d$ are also obtained, as indicated in FIG. 1a. Here, as a feature, e.g. for a circular part, the length of its periphery can be used. Different distribution curves as indicated in FIGS. 1a–1c are obtained due to fluctuations in light intensity, i.e. brightness, on the circular part.

The separability method is one by which values for evaluation of features, called separability, for $F_1$–$F_3$ are calculated and one of them having a large separability is used for the categories $C_a$–$C_d$ in FIGS. 1a–1c. Here the separability SP ($C_k.C_{k+1}$) is represented by Eq. (1):

$$C_k \cdot C_{k+1} = \frac{|\mu_{k+1} + \mu_k|}{\sigma_{k+1} + \sigma_k} \quad (1)$$

where $\mu_k$: means value of the category $C_k$ for the feature $F_i$, $\mu_{k+1}$: mean value of the category $C_{k+1}$ which is adjacent to $C_k$ (category whose mean value is next larger), $\sigma_k$: standard deviation of the category $C_k$ for feature $F_i$, and $\sigma_{k+1}$: standard deviation of the category $C_{k+1}$ which is adjacent to $C_k$.

The separability is calculated for each of the distribution data indicated in FIGS. 1a–1c (e.g. the mean value of the category $C_a$ for feature $F_1$, $\mu_a = 1$ and the standard deviation $\sigma_a = 1$ are shown in the figure). For example, 3 values of the separability of $F_1$ for each category are obtained for 3 pairs of categories, which are adjacent to each other, $C_a$–$C_b$, $C_b$–$C_c$ and $C_c$–$C_d$. Among them the separability data having the largest value is obtained as follows:

$$\overline{C_c \cdot C_d(F_1)} = \frac{|\mu_c - \mu_d|}{\sigma_c + \sigma_d} = \frac{|3 - 11|}{1 + 1} = \frac{8}{2}$$

The value of the separability for each of the features $F_1$, $F_2$ and $F_3$ is given in FIGS. 1a–1c.

According to this separability method, the separability is large, in the case where one category such as $C_d$ in the feature $F_1$ is far away from the distribution groups for the other categories. Consequently, in the case where a decision tree dictionary is prepared by the separability method, at first the feature $F_1$ is predominant.

Since it is between $C_c$ and $C_d$ that the distribution can be divided safely on the axis of $F_1$, the categories $C_a$, $C_b$, $C_c$ and $C_d$ are divided into 2 groups, one consisting of $C_a$, $C_b$ and $C_c$ and the other consisting only of $C_d$. Next, the ranking of the features is decided for $C_a$, $C_b$ and $C_c$ and it is found that $F_2$ is predominant. Repeating analogous procedures, it is possible to classify the distribution into 4 categories, $C_a$, $C_b$, $C_c$ and $C_d$, which are separated from each other. However, it is clear from FIG. 1c that the distribution can be classified well most rapidly into separate categories, if the classification is effected by using the feature $F_3$.

According to this separability method, the number of calculation steps for the features becomes too great and calculations for the features take too much time. (This problem is identical for the stability coefficient method and the variance ratio method.)

As stated above, according to the prior art method, such as the separability method, etc., the recognition time increases proportionally to the number of features which are to be extracted from categories before the recognition result is outputted. For this reason, the decision tree dictionary should be so designed that the number of features is as small as possible. Nevertheless, in the prior art methods, the number has not been taken into account at all. Consequently, the decision tree structure and the recognition speed as a result are accidentally determined and shortening of the recognition time has never been intended.

Accordingly, the present inventors have already filed a United States patent application entitled "System and Method for Preparing a Recognition Dictionary" (Ser.

No. 687757) wherein a system and method for classifying categories by using a feature giving the largest separation distribution number have been proposed. This separation distribution number method is one by which a decision tree which is shallow in average can be constructed by arranging the categories to be classified in the order of an increased combination number of categories.

However, the object, shortening of the recognition time, has, in general, two aspects; namely one is the shortening of the maximum recognition time, and the other is the shortening of the total recognition time. The maximum recognition time means the largest value of the time which is necessary for recognizing one of the categories. On the other hand, the total recognition time means the time which is necessary for recognizing the total categories. The separation distribution number method, which the inventors have previously proposed, is the one in which principally a shortening of the total recognition time is taken into account. Depending on applications to objects to be recognized, there are many cases where it is desired to shorten the maximum recognition time (or both the total recognition time and the maximum recognition time).

SUMMARY OF THE INVENTION

The object of the invention is to provide a system and method makes it possible to prepare automatically a decision tree dictionary, for which the number of features, which are to be extracted from distribution data of a plurality of categories on the axes of a feature before the recognition result is outputted, is small and to try to shorten both the maximum recognition time and the total recognition time.

This invention provides a system and method for preparing a recognition dictionary of decision tree structure, by which classification is effected while allocating each of a plurality of features prepared for objects to be recognized to each of the nodes of a decision tree. Some preferred embodiments of this invention includes the following means or steps.

(a) The maximum depth of the decision tree, which is necessary for recognizing one object among a plurality of objects to be recognized, is estimated.

(b) The total number of nodes, which is the sum of the depths of the decision tree necessary for recognizing all of the objects to be recognized, is estimated.

(c) A feature, for which the maximum estimated depth is the smallest, according to the step (a), or a feature, for which the sum of the estimated numbers of nodes is the smallest, according to the step (b), are extracted independently.

The maximum recognition time, which is the largest value of the time necessary for recognizing one of the objects to be recognized, or the total recognition time necessary for recognizing all of the object to be recognized can be independently shortened by allocating or assigning the features thus obtained to each of the nodes of the decision tree.

BRIEF DESCRIPTION OF THE DRAWINGS

FIG. 2 shows an example of decision trees for identifying words;

FIG. 3 indicates two schemes for explaining the recognition time, which is a problematical point in the recognition using a decision tree;

DESCRIPTION OF THE PREFERRED EMBODIMENTS

Figure 1A:
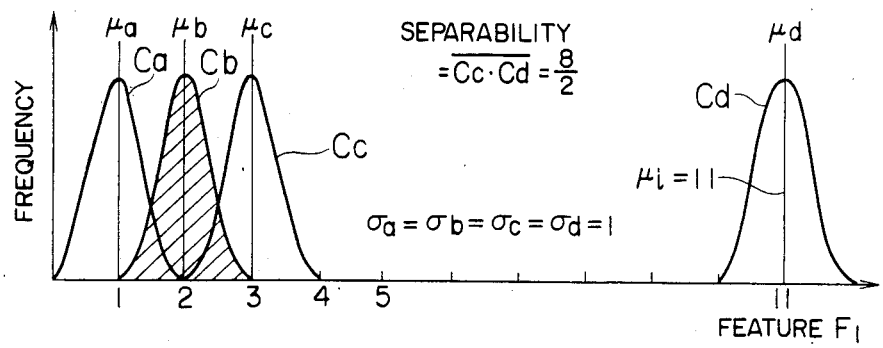
FIGS. 1a-1c are schemes showing some examples of the feature distribution and the separability.
Figure 1B:
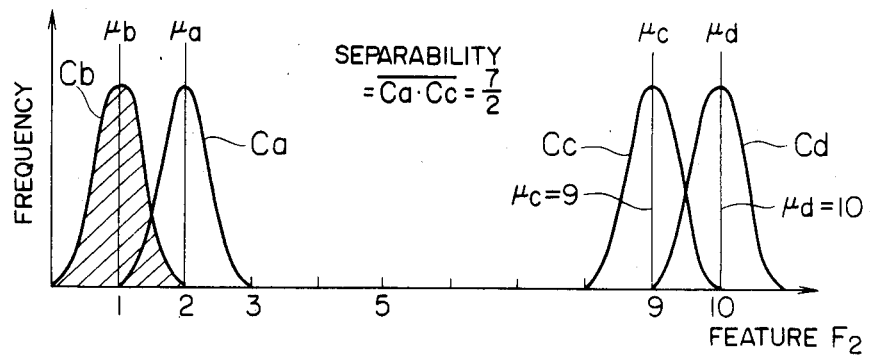
Figure 1C:
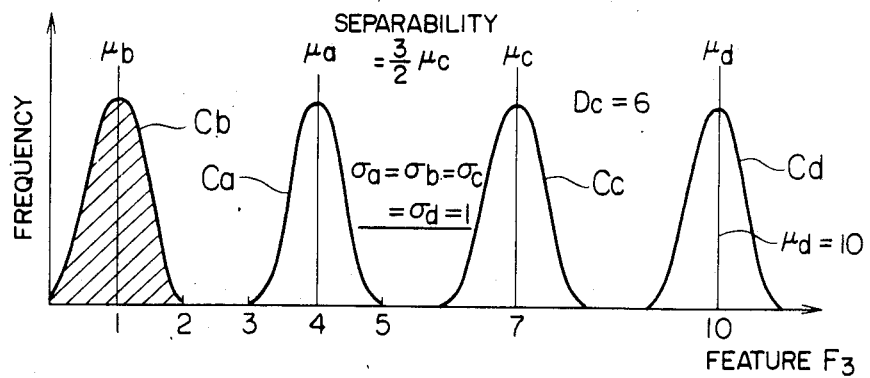

Before the explanation of each of the embodiments according to this invention the principle of this invention will be explained, referring to FIGS. 2-4.

One of the most important features of a recognition process using a decision tree dictionary, is that the number of categories remaining as candidates decreases exponentially, as identification advances along a decision tree and as the result the recognition result can be obtained by a small number of feature extractions.

In general, since the recognition time is determined almost uniquely by the time necessary for the feature extraction. The feature mentioned above is very useful for shortening the recognition time. Consider now <Tree I> and <Tree II>, which are examples of decision trees for identifying words, shown in <Problem> of FIG. 2. Each of the numbers inscribed at the nodes of the Tree indicates where the letter to be extracted from an unknown word is from the initial place of the word and each of the letters between parentheses indicate the one to which the relevant extracted letter corresponds. That is, they are decision trees, for which each of the letters of a word is considered as a feature. For <Tree I>, if two letters can be extracted from an unknown word, the answer is always obtained. That is, the answer can be obtained more rapidly in this way than by trying to identify an unknown word with a word in the dictionary while extracting simply 3 letters for the unknown word. On the other hand, for <Tree II>, with respect to Boy and Bob, three letters must be extracted, but with respect to Bet, Can and Sin, the answer can be obtained by extracting only one letter. Therefore, it can be said that, for either tree, the answer can be obtained more rapidly than by always extracting 3 letters. The trees have different properties. That is, <Tree I> has a short maximum recognition time and <Tree II> has a short total recognition time (or a short mean recognition time).

Here the maximum recognition time is the largest value of the time necessary for recognizing one of the categories. In other words, it is the total sum of the calculation times of features from the disclosure point of the decision tree evaluated for the highest rank category to the deepest point at the extremities of the decision tree.

On the other hand, the total recognition time means the time necessary for recognizing all the categories. In other words, it is the total sum of the calculation times of features from the disclosure point of the decision tree evaluated for the highest rank category to all the extremities of the decision tree.

Since the maximum recognition time is proportional to the number of features extracted before the recognition result is outputted, if the maximum recognition time and the total recognition time of <Tree I> and <Tree II> are represented by the number of features, the following result is obtained:

<Tree I>
  Maximum recognition time: 2
  Total recognition time: 16
<Tree II>
  Maximum recognition time: 3
  Total recognition time: 15

On the other hand, the recognition time, which is important for the pattern recognition, has also the maximum recognition time indicated in ① and the total recognition time indicated in ② (FIG. 3).

Problem 1:

The maximum recognition time in ① should be taken into account, e.g. in "the case where objects to be recognized are disposed on a belt conveyor, which can move only with a constant speed, and the objects are viewed one after another by a camera, in order to know their category", because the maximum time necessary for recognizing one of the categories determines the working speed of the belt conveyor, i.e. the cost of the whole line. On the other hand, the total recognition time in ② should be taken into account, e.g. in "the case where a plurality of types of objects should be viewed as images at once, in order to know their position", because the total time necessary for recognizing all the imaged objects determines the cost of the whole line.

In general, it can be supposed that which recognition time, ① or ②, should be taken into account depends on the application of the system. That is, it is possible to realize a flexible and rapid recognition for various applications, if the recognition system is provided with means which makes it possible to shorten independently the maximum recognition time and the total recognition time for the preparation of the recognition dictionary of decision tree structure. This is the reason why the present inventors have decided to dispose a means which makes it possible to shorten independently the maximum recognition time and the total recognition time in the process for preparing the recognition dictionary of decision tree structure.

Problem 2:

Further there remains another problem, by what method the maximum recognition time or the total recognition time can be shortened. In the case where the number of types of objects to be recognized and the features representing the objects (e.g. the number of letters of a word) is small, as for example shown in FIG. 2, it is the surest method to select a suitable one after having prepared all the conceivable decision trees. However, in the case where the number of types of objects to be recognized and the features thereof are great (e.g. case where a decision tree as indicated in FIG. 2 is prepared for all the words in an English-Japanese dictionary), the necessary processing time is too long to be realistic. Therefore, a method which makes it possible to shorten easily the maximum recognition time or the total recognition time is necessary for the preparation of a decision tree.

The automatic preparation of a decision tree can be effected generally by following the steps as indicated below.

Step 1: a feature for classifying the class of highest rank consisting of a plurality of categories is selected by using a certain evaluation measure.

Step 2: the class of highest rank is classified on the axis of the feature selected in Step 2 into a plurality of new classes of next rank.

Step 3: when either one of the classes consists of a plurality of categories, the same process is applied to the class, and when all the categories are separated, the process is terminated.

That is, the method for selecting the feature of Step 1 described above and the method for the classification of Step 2 determine the tree structure.

The present invention provides a new method for the feature selection which makes it possible to shorten independently the maximum recognition time and the total recognition time. This invention will be explained below, refering to FIGS. 4a and 4b.

Suppose now that the class of highest rank consists of a plurality of categories {A, B, C, D, E, F, G, H} and that it is classified on the axis of a feature, e.g. $X_i$ among features {$X_1$, ..., $X_n$}, into a plurality of classes {A, B, C}, {D, E, F}, {G, H} of next rank. The decision trees used in the succeeding process are presumed on the basis of the number of categories for each class of next rank resulting from this classification. The maximum recognition time ⓐ for the decision tree thus presumed and beginning with the feature $X_i$, i.e. the number of extracted features from the feature $X_i$ to the deepest point at the extremities of the presumed decision tree (hereinbelow called maximum estimated depth) or ⓑ the total recognition time, i.e. the number of extracted features from the feature $X_i$ to all the extremities of the estimated decision tree (hereinbelow called sum of estimated node numbers) are used as the evaluation measure for the feature selection. This evaluation measure for the feature selection is obtained every time for a classification with respect to each of the features {$X_1$, ..., $X_n$} other than $X_i$, which are objects of the selection.

Figures 4A, 4B:
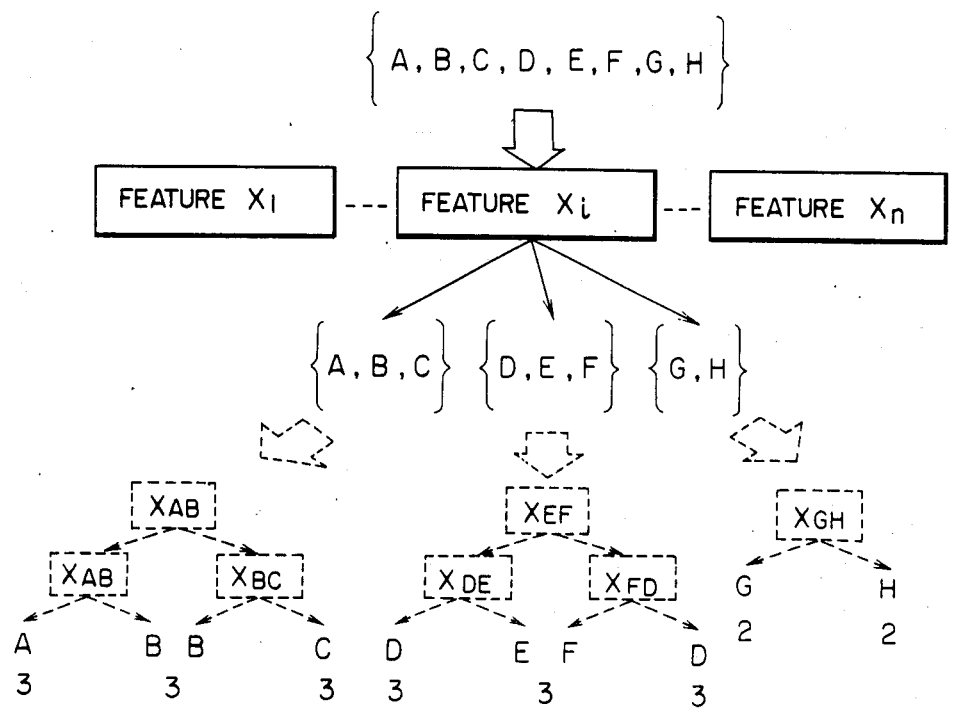
FIGS. 4a and 4b are conceptional schemes for the feature selection method.

In this way, it is possible to form a decision tree, for which the maximum recognition time is small, when the classification is effected always by using the feature giving the smallest maximum presumed depth among the features {$X_1$, ..., $X_n$}, and the total recognition time is small, when the classification is effected always by using the feature giving the smallest sum of numbers of presumed nodes Here it is possible to obtain easily the maximum estimated depth and the sum of estimated node numbers for the presumed decision tree of an arbitrary class {D, E, F} of lower rank resulting from the classfication with respect to the feature $X_i$, as e.g. previously indicated in FIG. 4a, supposing the worst decision tree. The worst decision tree is the one, which is obtained, supposing that there exist only the following features in the process for forming a decision tree succeeding the class {D, E, F} of lower rank:

$X_{EF}$: can separate E and F, but cannot separate E and D as well as F and D, $X_{DE}$: can separate D and F, but cannot separate D and F as well as E and F, $X_{FD}$: can separate F and D, but cannot separate F and E as well as D and F.

In the arrangement of $X_{EF}$, $X_{DE}$ and $X_{FD}$, various cases, where the categories D, E and F are arranged differently, are conceivable, but the tree structures are identical for all the cases. At this time the maximum estimated depth of the class {D, E, F} of the lower rank is 3, which is the same as the number of categories of the class. Further, concerning the sum of estimated node numbers for the class {D, E, F} of lower rank, the category D is at the extremities of the branches $X_{DE}$ and $X_{FD}$. Supposing that "the number of cases" of D is 1 and that "the number of cases" is 1 for E and F, respectively, since the decision tree is the one for extracting 3 features with respect to the 3 categories, the sum of estimated node numbers is $3 \times 3 = 9$. That is, it is equal to the square of the number of categories of the class.

Consequently, if $\{N_1, N_2, \ldots, N_K\}$ denote the number of categories of each of the classes of lower rank resulting from the classification of a class of higher rank consisting of a plurality of categories, the maximum estimated depth and the greatest sum of estimated node numbers can be represented as follows:

the maximum estimated depth;

$$\max_{1 \leq i \leq K} \{N_i\} \qquad (2)$$

and the sum of numbers of presumed nodes;

$$\sum_{i=1}^{K} \{N_i^2\} \qquad (3)$$

The recognition time can be shortened by selecting the feature, for which the maximum estimated depth or the sum of numbers of estimated nodes thus obtained is smallest, ($X_i$ according to FIG. 4b) and by allocating it to the first node in FIG. 4a. Furthermore, depending on the application, in the case where it is needed to shorten only the maximum recognition time, it is sufficient to take only the maximum estimated depth and to select the decision tree giving the smallest value of the maximum estimated depth independently of the sum of estimated node numbers. (When it is desired to shorten only the total recognition time, the process is analogous.)

An embodiment of this invention will be explained, referring to FIGS. 5-17. This embodiment relates to the preparation of a recognition dictionary for an image recognition system recognizing image information.

Figure 5:
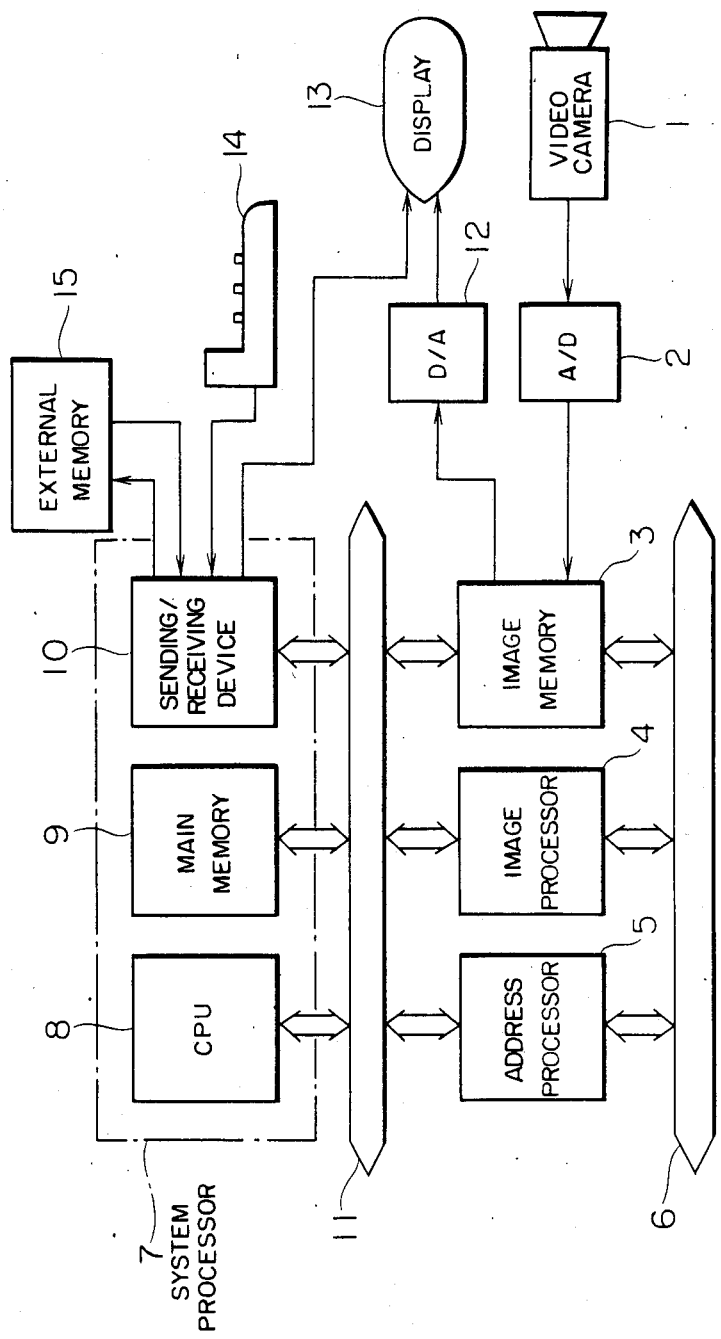
FIG. 5 is a whole construction scheme of an example of image recognition systems according to this invention.

FIG. 5 indicates the whole construction of the image recognition system of this embodiment.

(1) Construction

This system consists of a video camera 1 transforming light signals into electric signals; an A/D converter 2 transforming analogue signals coming from the video camera 1 into digital signals; an image memory 3 storing the digital signals sent by the A/D converter 2; an image processor 4 operating and treating the content of the image memory 3; an address processor 5 controlling the access to the image memory 3; an image processor bus 6 for transmitting data and control signals among the image memory 3, the image processor 4 and the address processor 5; a system processor 7 controlling the image recognition system, which comprises as internal constituent elements a central processing unit 8, a main memory 9, a sending/receiving device 10 for sending/receiving signals to/from peripheral devices; a system bus 11 for transmitting data and control signals between different elements constituting the image recognition system; a D/A converter 12 transforming digital signals coming from the image memory 3 into analogue signals; a display device 13 transforming digital signals coming from the sending/receiving device 10 into character codes and displaying them, and further displaying analogue signals coming from the D/A converter as images; a keyboard 14 for inputting data from outside the system in the sending/receiving device 10; and an external memory 15 for storing data necessary for starting the whole image recognition system.

Figure 6:
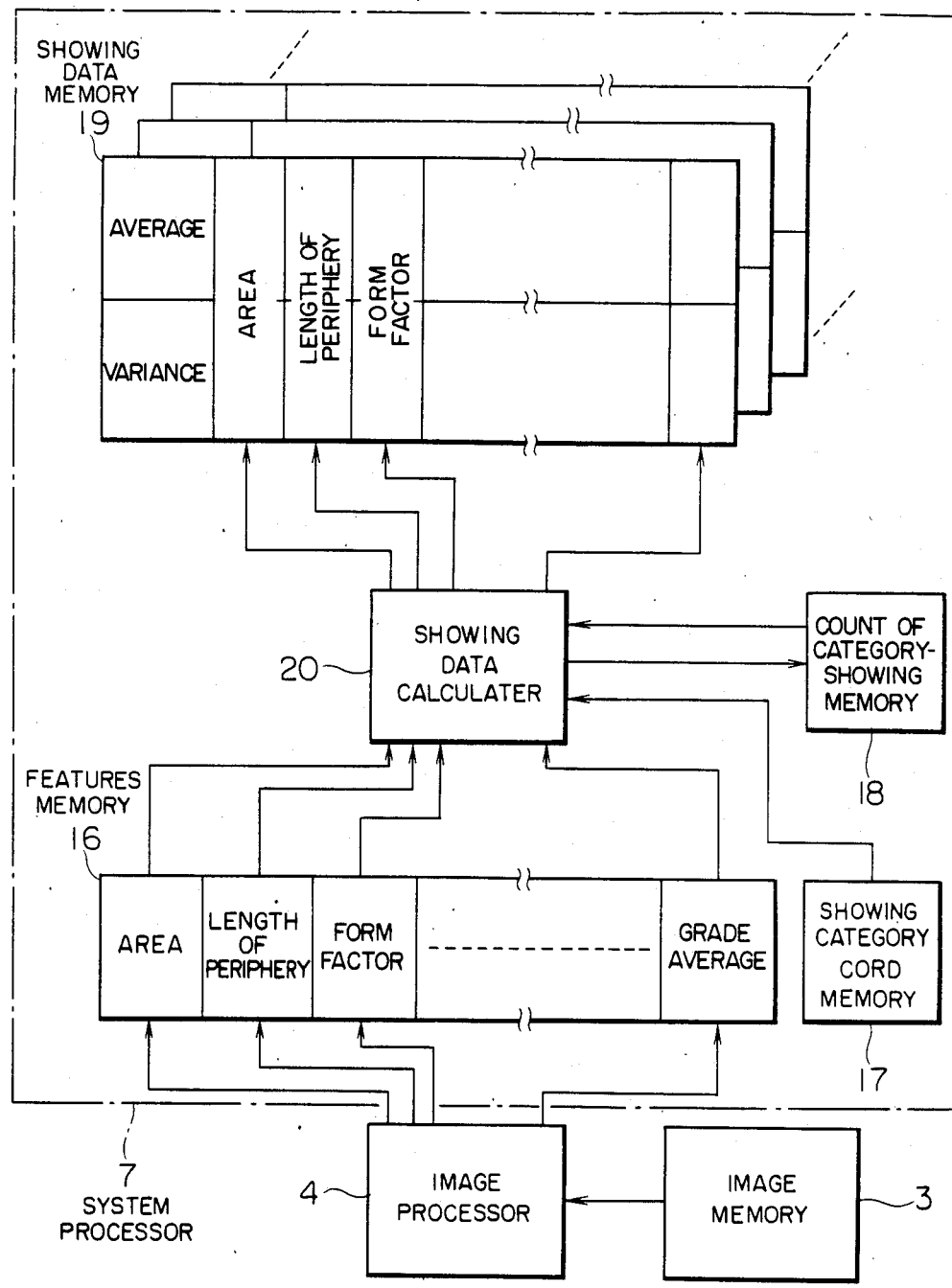
FIG. 6 shows the internal structure of the showing portion in an embodiment according to this invention.

The module preparing the decision tree dictionary is realized in the form of a program for the system processor 7. The program for forming the recognition dictionary is divided roughly into two portions. One of them is the showing portion taking preliminary data for preparing the recognition dictionary in the form of a conversation with the operator and the other is the dictionary preparation portion for forming the recognition dictionary on the basis of the data taken from the showing portion. FIG. 6 indicates the construction of the showing portion and FIG. 7 shows that of the dictionary preparation portion.

The showing portion consists of a feature memory part 16 storing the value of a plurality of features (e.g. area, length of periphery, form factor, average shade, etc.) of the image (or the imaged body), which the image processor 4 extracts from the images stored in the image memory 3; a showing category code memory part 17, where the code of the categories of the image (on the imaged body) is memorized; a category showing count memory 18, where the number of feature extractions for each of the categories which are objects to be recognized; a showing data memory part 19 memorizing the average and the variance value for each of the categories which are objects to be recognized; and a showing data calculation part 20 obtaining new average and variance values of each of the features for the category from which the feature has been extracted on the basis of the contents of the showing category code memory part 17, the feature memory part 16, the showing data memory part 19 and the category showing count memory part 18. The dictionary preparation portion is realized as a program in the processor 7, as shown in FIG. 7, and consists of an initialization part 21 initializing the dictionary preparation portion; a decision tree dictionary 22 consisting of a plurality of the cells of same format corresponding to the nodes of the decision tree; a search cell number memory part 23, in which the number of cell which is object to be researched is memorized; a write-in cell number memory part 24, in which the number of the cell, object where information as a dictionary is written-in, is memorized; a cell research part 25 deciding whether branching is necessary thereafter or not, on the basis of information in the cell (i.e. node of the decision tree) of the research cell number; a feature selection part 26 selecting a feature to be allocated to the cell, for which it is decided by the cell research part 25 that branching is necessary; a classification safety factor memory part 27 memorizing the classification safety factors necessary for the feature selection part 26; a tree structure specification code memory part 28 memorizing the codes indicating whether the recognition time to be shortened for the decision tree structure recognition dictionary prepared here is the maximum recognition time or the total recognition time; a feature code memory part 29 memorizing the feature code outputted by the feature selection part 26; and a cell write-in part 30 forming new cells (nodes of the decision tree) by using information of the feature code memory part 29 and the cell for which branching is necessary (i.e. the node of the decision tree).

Figure 8:
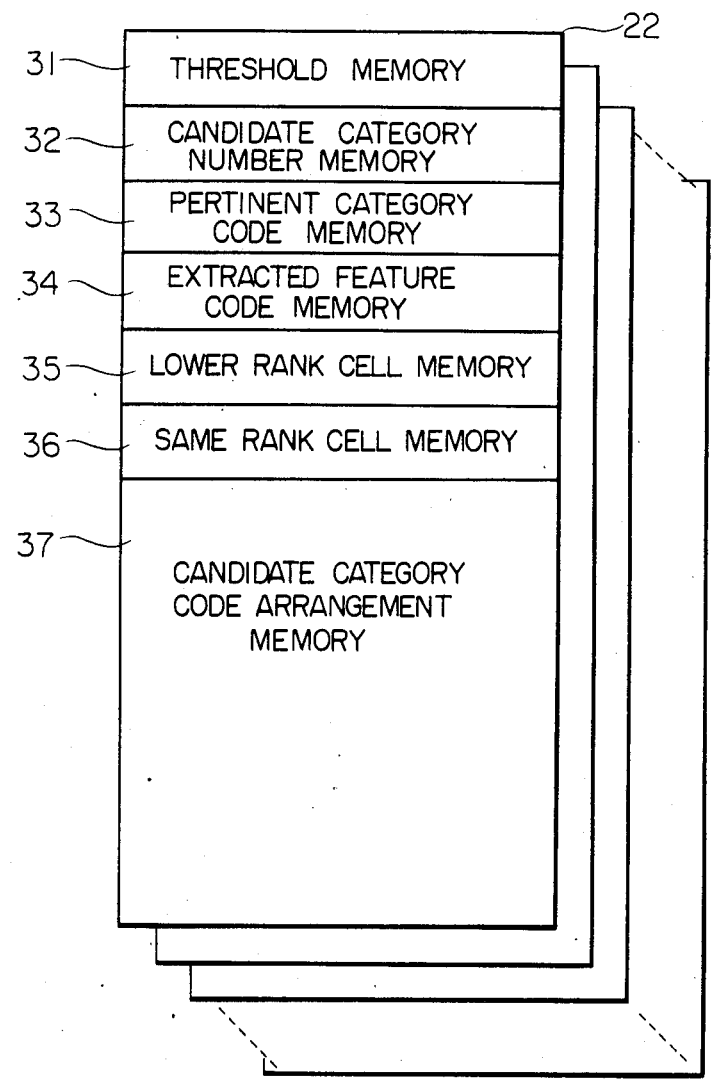
FIG. 8 shows the internal structure of the cell constituting a recognition dictionary.
Figure 9:
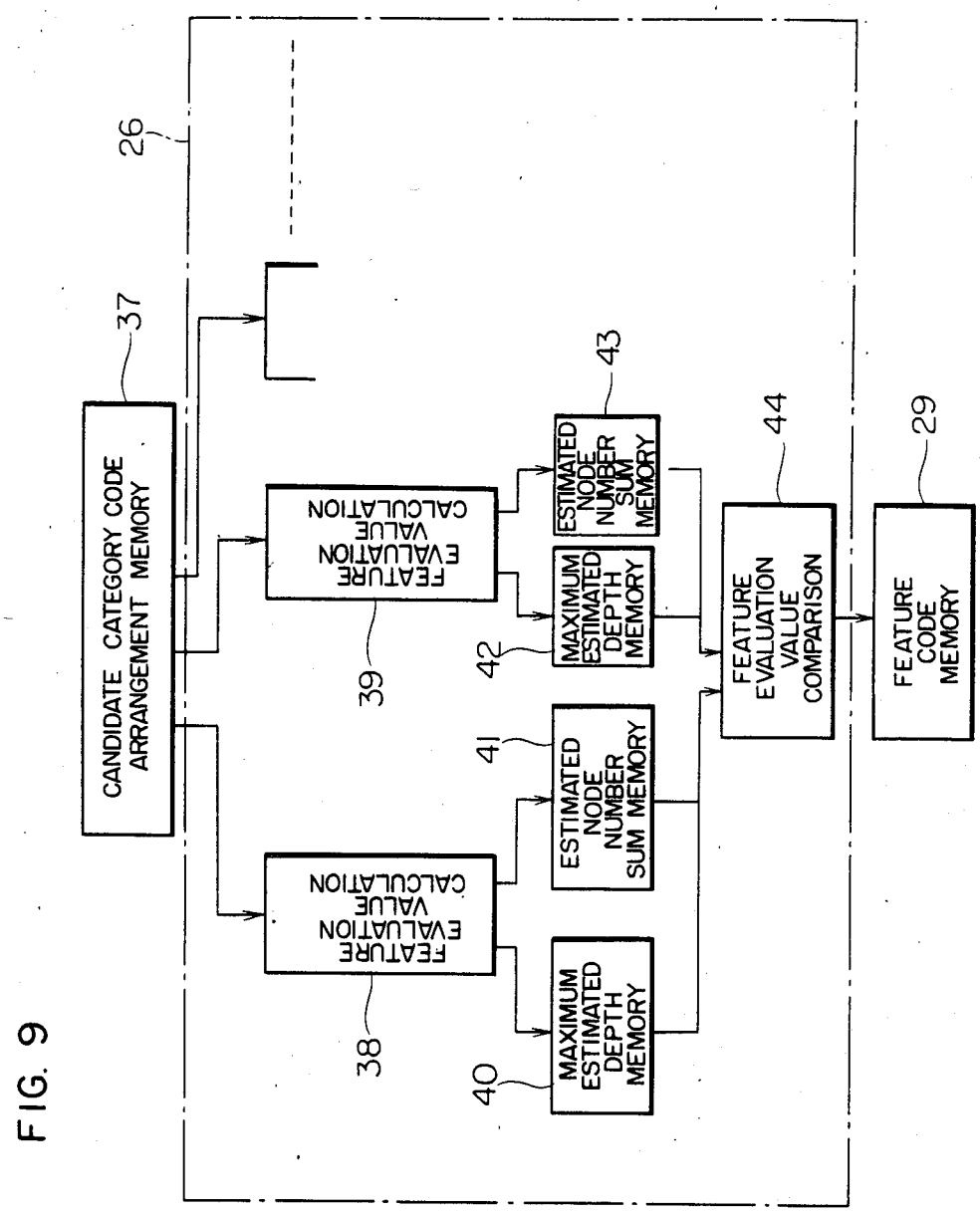
FIG. 9 shows the internal structure of the feature selection part, which is a part of the recognition dictionary preparation portion.

FIG. 8 indicates the interval structure of the cell constituting the recognition dictionary 22; FIG. 9 the internal structure of the feature selection part 26; and FIG. 10 the internal structure of the feature evaluation value calculation part 38 in the feature selection part 26.

Figure 7:
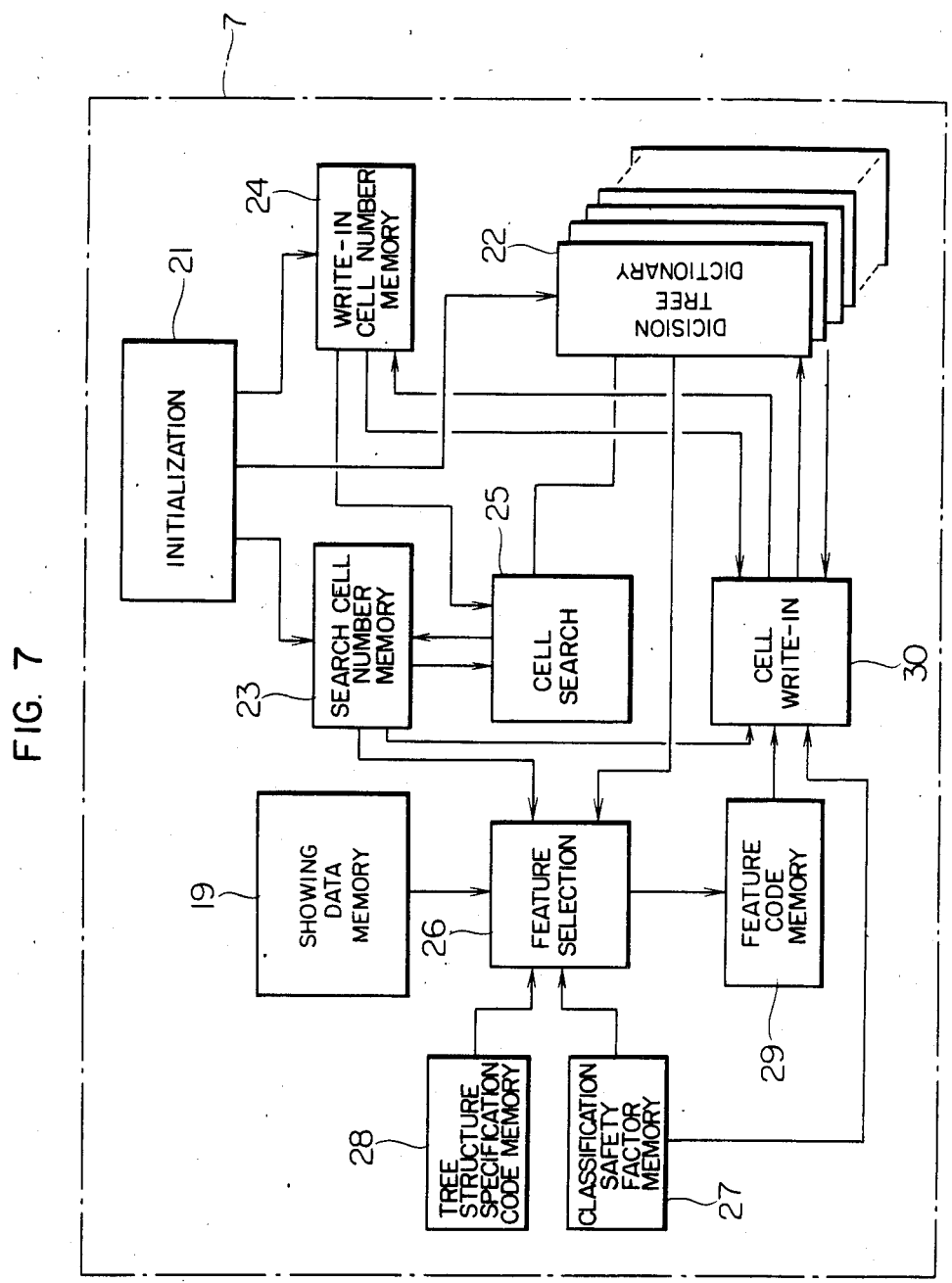
FIG. 7 shows the internal structure of the recognition dictionary preparation portion in an embodiment according to this invention.

Each cell in the recognition dictionary 22 indicated in FIG. 7 consists, as indicated in FIG. 8, of a threshold value memory part 31 memorizing the threshold value, with which the feature extracted by the cell higher by one rank than the relevant cell (i.e. the node higher by one rank) is compared; a candidate category number memory part 32 memorizing the number of candidate categories for which the feature extracted by the cell higher by one rank than the relevant cell is greater than the threshold value; a pertinent category code memory part 33 memorizing the code of the candidate category which is effective only when the number of candidate categories is 1; an extracted feature code memory part 34 memorizing the code of the newly extracted feature, when the number of candidate categories is equal to or greater than 2: a lower rank cell number memory part 35 memorizing the number of the cell lower by one rank (i.e. the node lower by one rank) memorizing the threshold, with which the here extracted feature is compared; a same rank cell number memory part 36 memorizing the number of the cell of same rank (i.e. branch of the decision tree) memorizing the highest threshold, which is lower than the threshold value 31 used for the comparison, when the feature extracted by the higher rank cell is smaller than the threshold value 31; and a candidate category code arrangement memory part 37 memorizing the arrangement of the pertinent candidate category codes (i.e. the class consisting of a plurality of categories), which are effective only when the number of candidate categories 32 is equal to or greater than 2.

The feature selection part 26 indicated in FIG. 7 consists, as shown in FIG. 9, of a feature evaluation value calculation part 38 (39) calculating the evaluation value of the feature for the candidate category code arrangement stored in a certain candidate category code arrangement memory part 37; a maximum estimated depth memory part 40 (42) memorizirg the maximum estimated depth, which is the feature evaluation value outputted by the feature evaluation value part 38 (39); an estimated node number sum memory part 41 (43) memorizing analogously the sum of estimated node numbers; and a feature evaluation value comparison part 44 outputting the feature code for which the maximum estimated depth 40 (42) or the sum of estimated node numbers is the smallest. Further, the number of feature evaluation value calculation parts 38 (39), that of maximum estimated depth memory parts 40 (42), and that of estimated node number sum memory parts 41 (43) correspond to the number of the features memorized in the feature memory part 16 indicated in FIG. 6.

Figure 10:
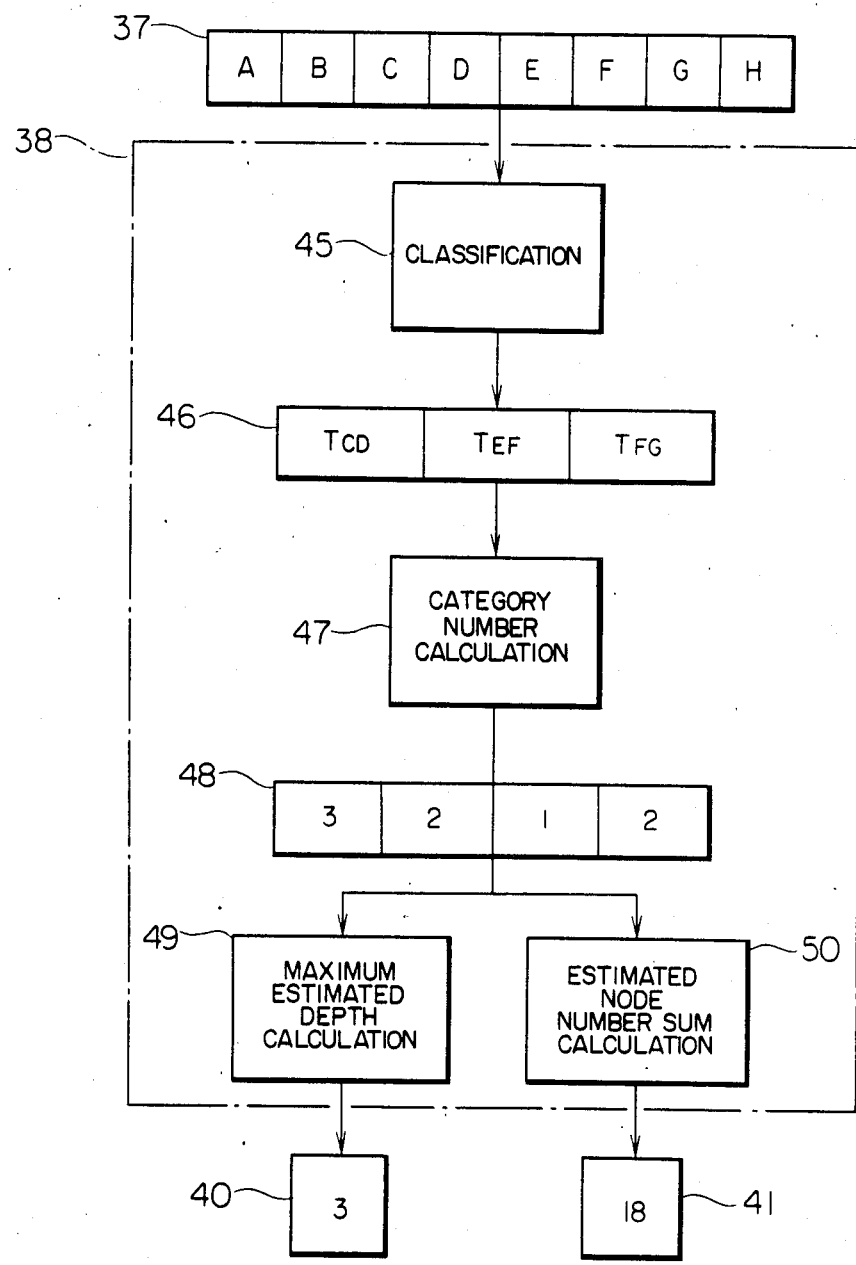
FIG. 10 shows the internal structure of the feature evaluation value calculation part, which is a part of the feature selection part.

FIG. 10 indicates the internal structure of the feature evaluation value calculation part 38 in FIG. 9 more in detail. The feature evaluation value calculation part 38 consists of a classification part 45 calculating the threshold value for classifying on feature axes arrangements (A, B, C, ..., H) of candidate categories stored in the candidate category code arrangement memory part 37; a threshold value arrangement memory part 46 memorizing the arrangement ($T_{CD}$, $T_{EF}$, $T_{FG}$) of threshold values outputted by the classification part; a category number calculation part 47 obtaining the number of categories contained in each of the classes resulting from the classification by means of the threshold value; a category number arrangement memory part 48 memorizing the arrangement (3, 2, 1, 2) of the number of categories contained in each of the classes of lower rank resulting from the classification by means of the threshold value; a maximum estimated depth calculation part 49 extracting the largest number of categories from the category number arrangement memory part 48; and an estimated node number sum calculation part 50 calculating the sum of the squares of the numbers of categories obtained from the cateory number arrangement memory part 48. The largest value (3) obtained from the maximum estimated depth calculation part 49 is stored in the maximum estimated depth memory part 40 indicated in FIG. 9 and similarly the sum of the squares of the numbers of categories obtained from the estimated node number sum calculation part 50 ($3^2+2^2+1^2+2^2=18$) is stored in the estimated node number sum memory part 41 indicated in FIG. 9.

(2) Operation mode

Next the operation mode of the system according to this embodiment will be explained. For preparing a recognition dictionary, the operation mode according to this embodiment can be divided roughly into two parts. One of them is the showing portion for taking preliminary data for preparing the recognition dictionary in the form of a conversation with the operator and the other is the dictionary preparation portion for preparing the recognition dictionary on the basis of the data taken from the showing portion.

Figure 11:
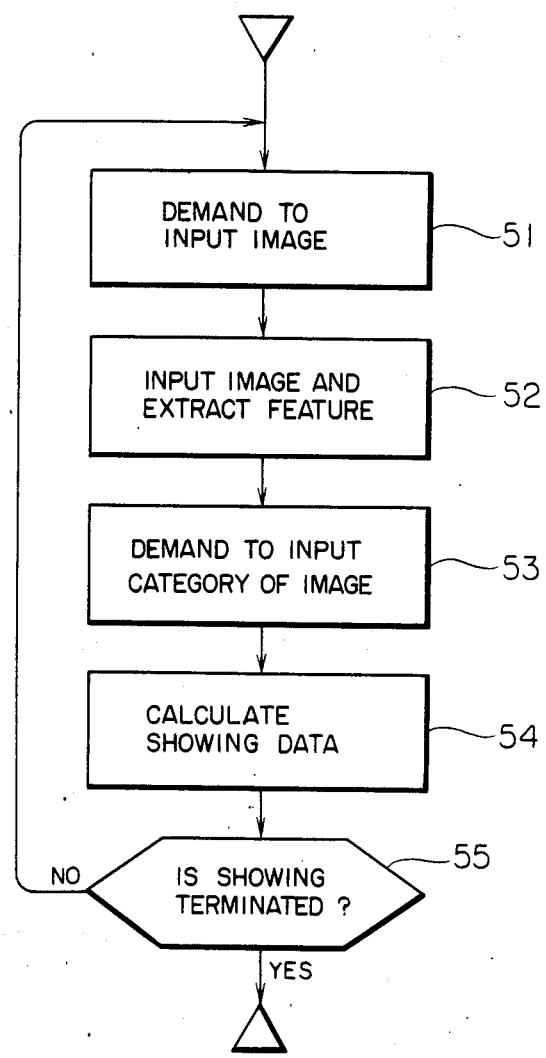
FIG. 11 is a flow chart indicating the operation mode of the showing part.

At first the operation mode of the showing portion will be explained, referring to FIGS. 5, 6 and 11. FIG. 11 indicates a flowchart for explaining the showing operation. When the system begins to work, in Step 51, a sentence calling an operator's attention to input an image is displayed in the display device 13 and the system waits for the input. At this moment the operator inputs a desired key code by means of the keyboard 14 after having verified that it is possible to image the object, which he desires to recognize, by means of the camera 1, and then proceeds to the following step. Next, in Step 52, the image of the object to be recognized coming from the camera 1 is stored through the A/D converter 2 in the memory 3 in the form of multigradation digital data. Further, the image processor 4 extracts features of the image, such as area, length of peripery, etc., when the content of the image memory 3 is transformed into a two-valued image, from the digital data in the image memory 3 and the value of the features is stored in the feature memory portion 16 in the system processor 7 (FIG. 6).

Then, in Step 53, a sentence calling an operator's attention to input the code of the category for the image is displayed in the display device 13 and the system waits the key input. At this moment the operator inputs the category code of the image by means of the keyboard 14 and then proceeds to the following step. The category code inputted here is stored in the showing category code memory part 17, and further the number of times of category showings stored in the category showing count memory 18 corresponding to the code in the showing category code memory part 17 is renewed.

Then, in Step 54, the showing data calculation part 20 calculates a new average and a variance value for each of the features of the category, from which the features have been extracted, on the basis of the information held in the feature memory part 16, the category showing count memory part 18, the showing data memory part 19 and the showing category code memory part 17, which are again memorized in the showing data memory part 19.

Next, in Step 55, a sentence calling an operator's attention to input if the showing should be continued or not is displayed in the display device and the system waits for the key input. Then, it is decided by the operator's key input if the showing is further continued or terminated. Here a recognition dictionary is prepared with respect to a registered category.

Figure 12:
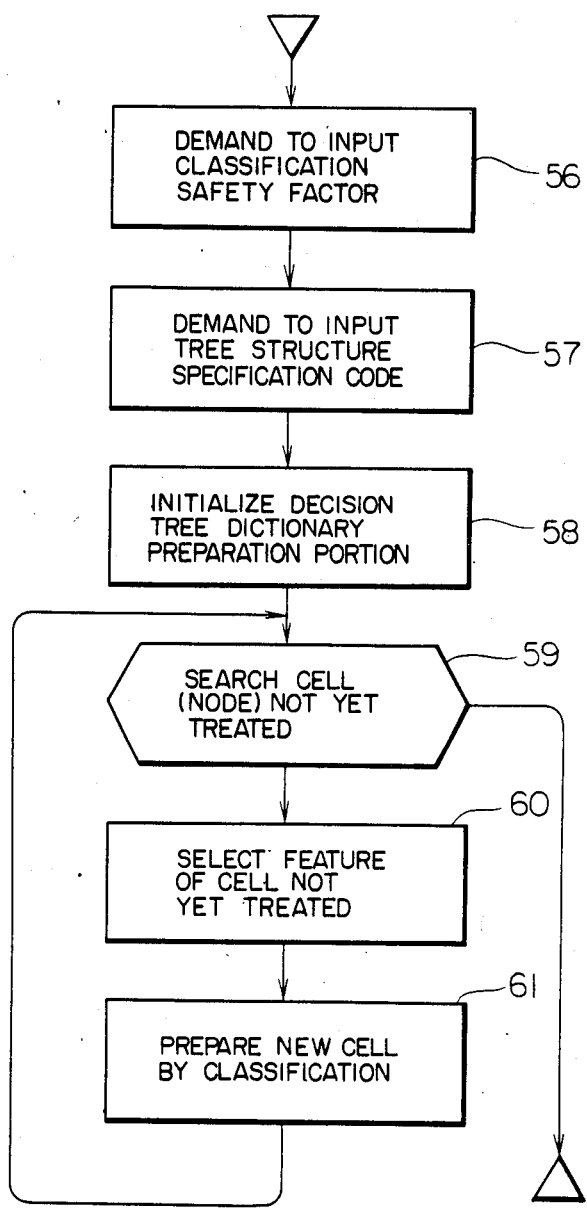
FIG. 12 is a flow chart indicating the operation mode of the recognition dictionary preparation portion.
Figure 13:
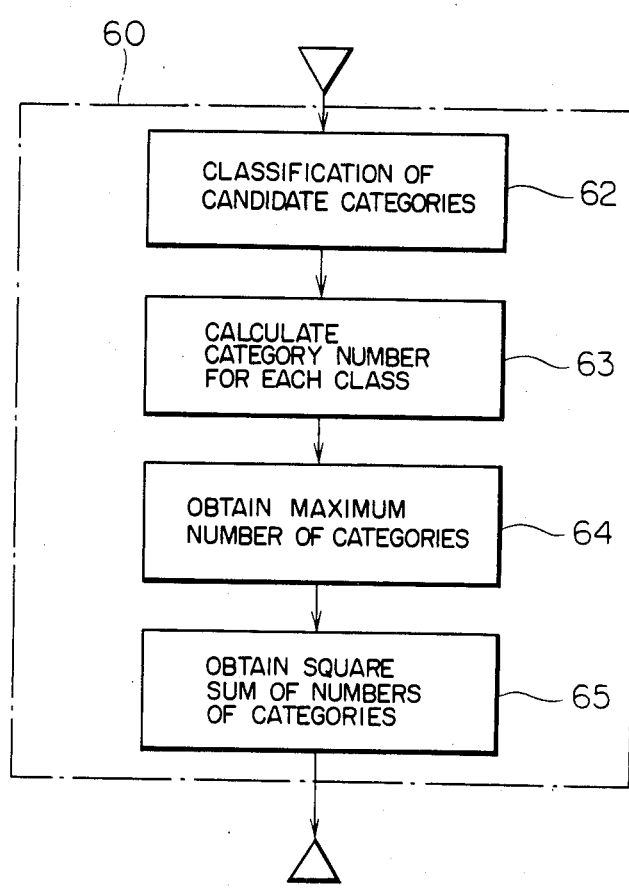
FIG. 13 is a flow chart indicating the operation mode of the feature evaluation value calcuation part.
Figure 14:
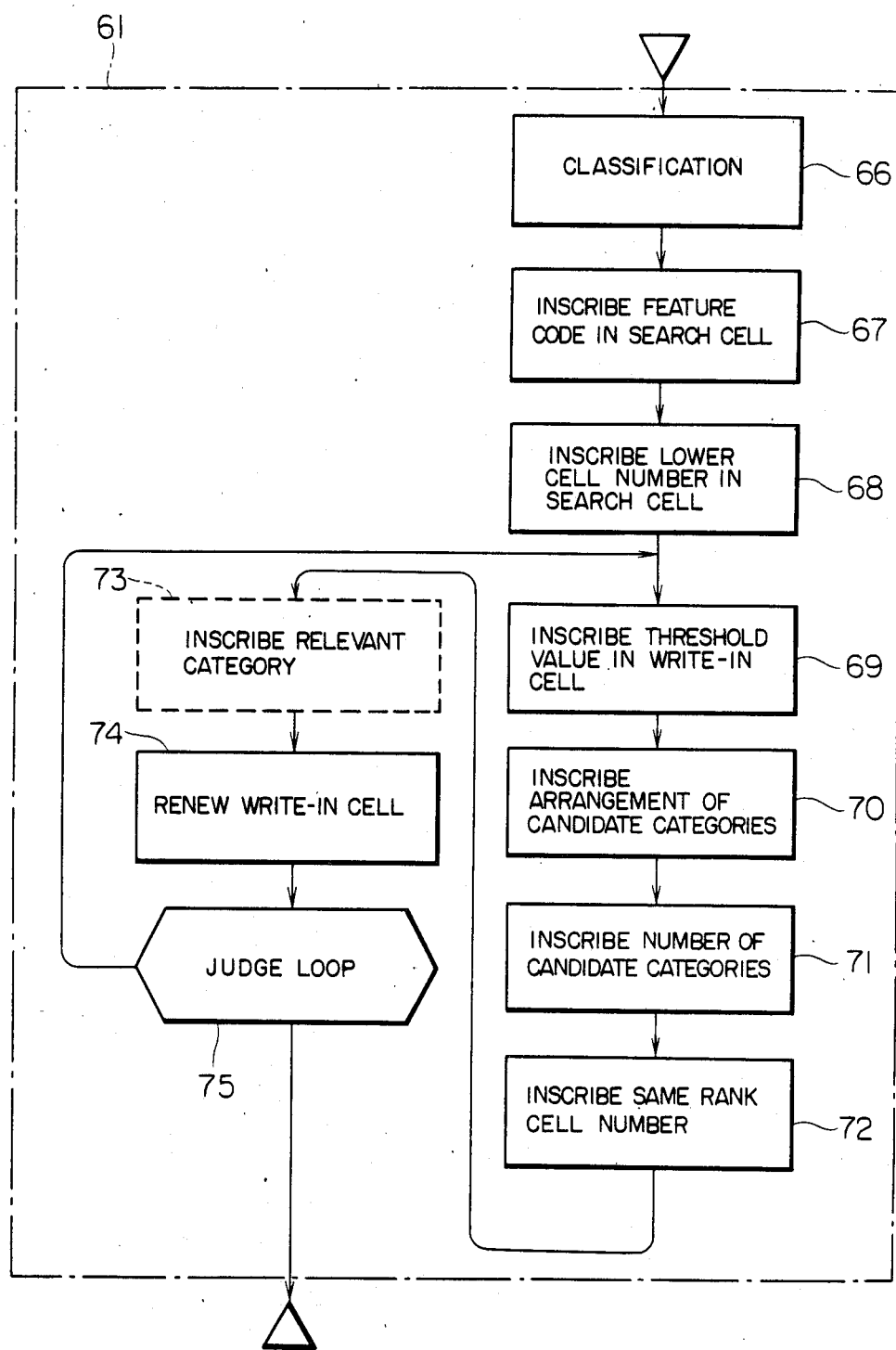
FIG. 14 is a flow chart indicating the operation mode of the cell write-in part of the recognition dictionary preparation portion.

Now, the operation mode of the dictionary preparation portion will be explained, referring to FIGS. 5–10 and FIGS. 12–14. FIG. 12 indicates a flowchart for explaining the operation mode of the dictionary preparation. The dictionary preparation portion begins to work, after the feature has been extracted for all the categories which the operator has desired to recognize by the showing. That is, in Step 56, a sentence calling an operator's attention to input the safety factor of the classification is displayed in the display device 13 and the system waits for the key input. Then, the operator inputs a suitable value by means of the keyboard 14 and proceeds to the following step. The value inputted here is stored in the classification safety factor memory 27 (FIG. 7). The classification safety factor will be described later.

Next, in Step 57, a sentence calling an operator's attention to input a tree structure specification code is displayed in the display device 13 and the system waits for the key input. Then, the operator inputs "0" or "1" as a tree structure specification code by means of the keyboard 14 and proceeds to the following step. The tree structure specification code inputted here is stored in the tree structure specification code memory part 28 (FIG. 7). Here the tree structure specification code is the one, which determines whether it is the maximum recognition time or the total recognition time that should be shortened, and a decision tree is formed for shortening the maximum recognition time, if the code is "0", and the total recognition time, if it is "1".

Then, the Step 58, in the dictionary preparation portion is intialized. That is, for all the cells of the decision tree dictionary 22 indicated in FIG. 8, the threshold memory part 31 is cleared to "0", the candidate category number memory part 32 and the lower rank cell number memory part 35 are cleared to "0", and non-existing values are put in the extracted feature code memory part 34 and the same rank cell number memory part 36 (e.g. if feature codes "0-63" exist, 127 is put here). Further, "0" is put in the research cell number memory part 23 and "1" is put in the write-in cell number memory part 24. In addition, the number of categories, from which features are extracted in the showing portion, is put as the number of candidate categories for the cell whose cell number is "0", and all the codes of the categories, from which features are extracted in the showing portion, are put as the candidate category code arrangement in the candidate category code arrangement memory part 37 of the cell.

Next, in Step 59, a cell not yet treated is looked for by the cell research part 25 and its number is memorized in the research cell number memory part 23. The research is carried out, starting from the cell stored in the research cell number memory part 23, in the order of the increasing cell number and the operation of the decision tree dictionary preparation portion is terminated, when the cell, which is in the course of treatment at that time, coincides which that stored in the write-in cell number memory part 24. Here a cell not yet treated, as stated above, is one for which there exists really no extracted feature codes and for which there are two or more candidate categories.

Then, in Step 60, a feature is selected by the feature selection part 26 for classifying the plurality of candidate categories of the cell not yet treated and stored in the feature code memory part 29. That is, the feature code for which the maximum estimated depth (40, 42, etc.) which is an estimated value of a feature obtained by each of the feature evaluation value parts (38, 39, etc.) as indicated in FIG. 9, or the sum of estimated node numbers (41, 43, etc.) is the smallest, is outputted by the feature evaluation value comparison part 44. Further, the outputted feature code is the one for which the maximum estimated depth, if the content of the tree structure specification code memory part 28 is "0" and the sum of estimated node numbers, if it is "1", is the smallest. FIG. 10 shows the internal structure of the feature evaluation value calculation part (38, 39, etc.) and FIG. 13 indicates the flow of its working mode (Step 60). Now the working mode of the feature evaluation value calculation part 38 will be explained in detail. The other feature evaluation value calculation parts (39, etc.) differ therefrom only in that their object feature is different and all their operations take place according to the flow indicated in FIG. 13. Further their internal structure is identical to that indicated in FIG. 10. The feature evaluation value calculation part 38 classifies at first, in Step 62, by the classification part 45, candidate categories (e.g. {A, B, C, D, E, F, G, H}) on the axis of the object feature with the classification safety factor stored in the classification safety factor memory part 27 and calculates threshold values. The calculation gives rise to a plurality of threshold values, which are stored in the threshold value arrangement memory part 46.

Next, in Step 63, the number of categories is obtained by the category number calculation part 47 for each of the lower rank classes resulting from the classification by using the threshold value stored in the threshold value arrangement memory part 46 (e.g. threshold value $T_{CD}$ between the categories C and D, etc.) and stored in the category number arrangement memory part 48. (For example, when threshold values $T_{CD}$, $T_{EF}$ and $T_{FG}$ give rise to lower rank classes {A, B, C}, {D, E}, {F} and {G, H}, the category number arrangement is (3, 2, 1, 2).)

Then, in Step 64, the largest element (3 in the example of FIG. 10) in the category number arrangement 48 is extracted by the maximum estimated depth calculation part 49 and stored in the maximum estimated depth memory part 40. Next, in Step 65, the sum of the squares of the elements of the category number arrangement 48 is calculated by the estimated node number sum calculation part 50 (in the example of FIG. 10, $3^2+2^2+1^2+2^2=18$), and the result is stored in the estimated node number sum memory part 41. In the above, the working mode of the feature selection part 26 comprising the feature evaluation value calculation part 38, etc. has been explained.

Next, returning to FIG. 12, in Step 61 the class consisting of candidate categories of the cell corresponding to the research cell number 23 is classified again on the axis of the feature stored in the feature code memory part 29 (FIG. 7) by the cell write-in part 30 and new cells are formed in the direction with increasing cell number starting from the cell stored in the write-in cell number memory part 24. The flow of the working mode of the cell write-in part 30 (Step 61) will be explained, referring to FIG. 14.

In the cell write-in part 30 indicated in FIG. 7, at first in Step 66, the arrangement in the candidate category code arrangement memory 37 of the cell corresponding to the research cell number stored in the research cell number memory part 23 is classified on the axis of the feature corresponding to the feature code stored in the feature code memory part 29.

Then, in Step 67, the content of the feature code memory part 29 is copied in the extracted feature code memory part 34 of the cell corresponding to the research cell number stored in the research cell number memory part 23. Thereafter, in Step 68, the content of the write-in cell number memory part 24 is copied in the lower rank cell number memory part 35 corresponding to the research cell number stored in the research cell number memory part 23.

Then Steps from 69 to 74 are repeated so many times that the number of repetitions is greater by 1 than the number of threshold values. In Step 69, the threshold values resulting from the classification are copied in the order of decreasing magnitude in the threshold value memory part 31 of the cell corresponding to the write-in cell number stored in the write-in cell number memory part 24. Further, for the (number of threshold values +1)-th loop, the threshold value is not inscribed. Thereafter, in Step 70, the code of the category comprised between the threshold value of the loop of that time and that of the preceding loop is copied in the candidate category code arrangement memory part 37 of the cell corresponding to the write-in cell number stored in the write-in cell number memory part 24. In the case where there exists no threshold value for the preceding loop, i.e. for the first loop, it is supposed that the threshold value of the preceding loop is infinitely great, and in the case where there exists no threshold value for the relevant loop, i.e. for the last loop, it is supposed that the threshold value of the loop is infinitely small.

Thereafter, in Step 71, the number of the candidate category is incribed in the candidate category number memory part 32 of the cell corresponding to the write-in cell number stored in the write-in cell number memory part 24. Then, in Step 72, the value, which is greater by 1 than the write-in cell number stored in the write-in cell number memory part 24, is inscribed in the same rank cell number memory part 36 of the cell corresponding to the write-in cell number stored in the write-in cell number memory part 24. Further, for the last loop the same rank cell number is not inscribed. Then, in Step 73, the candidate category code is copied in the category code memory part 33, only when the number stored in the candidate category number memory part 32 of the cell corresponding to the write-in cell number stored in the write-in cell number memory part 24. Then, in Step 74, the content of the write-in cell number memory part 24 is renewed. Then, in Step 75, the work of the cell write-in part 30 is terminated when the number of loops has reached the value which is greater by 1 than the number of thresholds obtained at Step 66.

Figure 15:
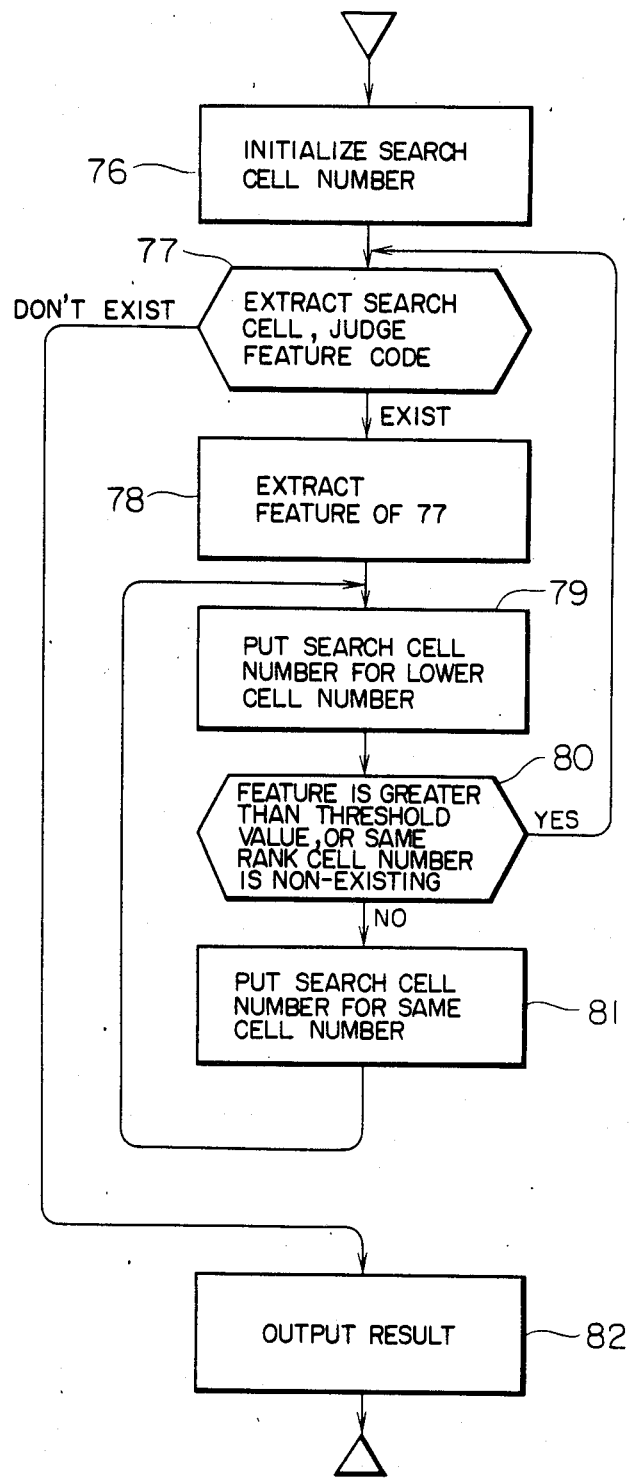
FIG. 15 is a flow chart for explaining the utilization mode of the recognition dictionary.

When the operation of the cell write-in part 30 (Step 61) is terminated, the process returns again to Step 59 in FIG. 12 and by repeating the similar operations, a recognition dictionary is prepared. In the above, an embodiment of the recognition dictionary preparation according to this invention has been explained. For reference a flow chart explaining the utilization mode of this recognition dictionary is shown in FIG. 15. Hereinbelow the utilization mode of this recognition dictionary will be explained, referring to this figure.

At first, in Step 76, put 0 for the first of the research cell number. Then, in Step 77, judge the feature code stored in the extracted feature code memory part 34 of the cell corresponding to the relevant research cell number. If the feature code is an existing code, proceed to Step 78 and if it is a non-existing code, proceed to Step 82. In Step 78, extract the feature corresponding to the extracted feature code of the cell corresponding to the research cell number from the inputted image. Then, put the lower rank cell number of the cell corresponding to the relevant research cell number for the research cell number. Thereafter, in Step 80, if the value of the feature extracted in Step 79 is greater than the threshold value 31 of the cell corresponding to the research cell number or if the same rank cell number of the cell corresponding to the research cell number is a non-existing one, proceed to Step 77, and otherwise proceed to Step 81. In Step 81, put the same rank cell number of the cell corresponding to the relevant research cell number for the research cell number, and proceed to Step 79. In Step 82, the information of the cell corresponding to the research cell number is outputted. That is, the relevant category code is outputted if the number stored in the candidate category number memory part 32 is 1. If the above-mentioned candidate category number is equal to or more than 2 indicating the presence of a plurality of the candidate categories, a code representing that the objective image cannot determined is outputted.

Next, another embodiment according to this invention will be explained below.

The time necessary for the calculation of the features extracted from an image fluctuates to some extent, depending o their nature. According to this invention, it is possible to form a decision tree, taking also these fluctuations in calculation time for the features into account. In this embodiment, supposing that the time necessary for the calculation of features, which are objects of selection is uniform, as evaluation values for the features, those represented by Eqs. (2) and (3) are used. Here, denoting the time necessary for calculation of a feature having a feature code k by T[k], when the average value of the calculation time for the features, which are objects of selection, is put at 1, the feature evaluation value taking the fluctuations in calculation time for the features into account can be represented as follows:

maximum estimated depth $$\max_{1 \leq i \leq K} \{Ni - 1 + T[k]\}. \quad (2)'$$

sum of estimated node numbers $$\sum_{i=1}^{K} Ni * (Ni - 1 + T[k]). \quad (3)'$$

where
K: number of lower rank classes resulting from the classification,
i: i-th lower rank class resulting from the classification,
Ni: number of categories of the i-th lower rank class resulting from the classification. That is, in the presumed decision tree, it is supposed that features requiring an average calculation time are used.

Thus decision trees permitting to realize rapid recognition can be easily formed, even if the time necessary for the calculation of the features extracted from an image fluctuates depending on their nature.

In the above, although some embodiments of this invention have been described for the automatic preparation of a recognition dictionary by means of an image recognition system, the object, which should be divided into a plurality of categories, is not limited to the outer form of bodies. For example, it is possible to recognize characters by means of a tree structure formed by selecting features effective for differentiating each of the characters, inputting light and shade information of each of the characters including alpha-numerics.

Furthermore, it is also possible to apply the method for preparing a recognition dictionary according to this invention to speech recognition.

As explained above, according to this invention, it is possible to prepare automatically a recognition dictionary, which can be used for recognizing objects to be recognized in a system for recognizing information, such as image, etc. and to recognize them rapidly.

The effect of this invention will be explained concretely, referring to FIGS. 16–18.

Figure 16:
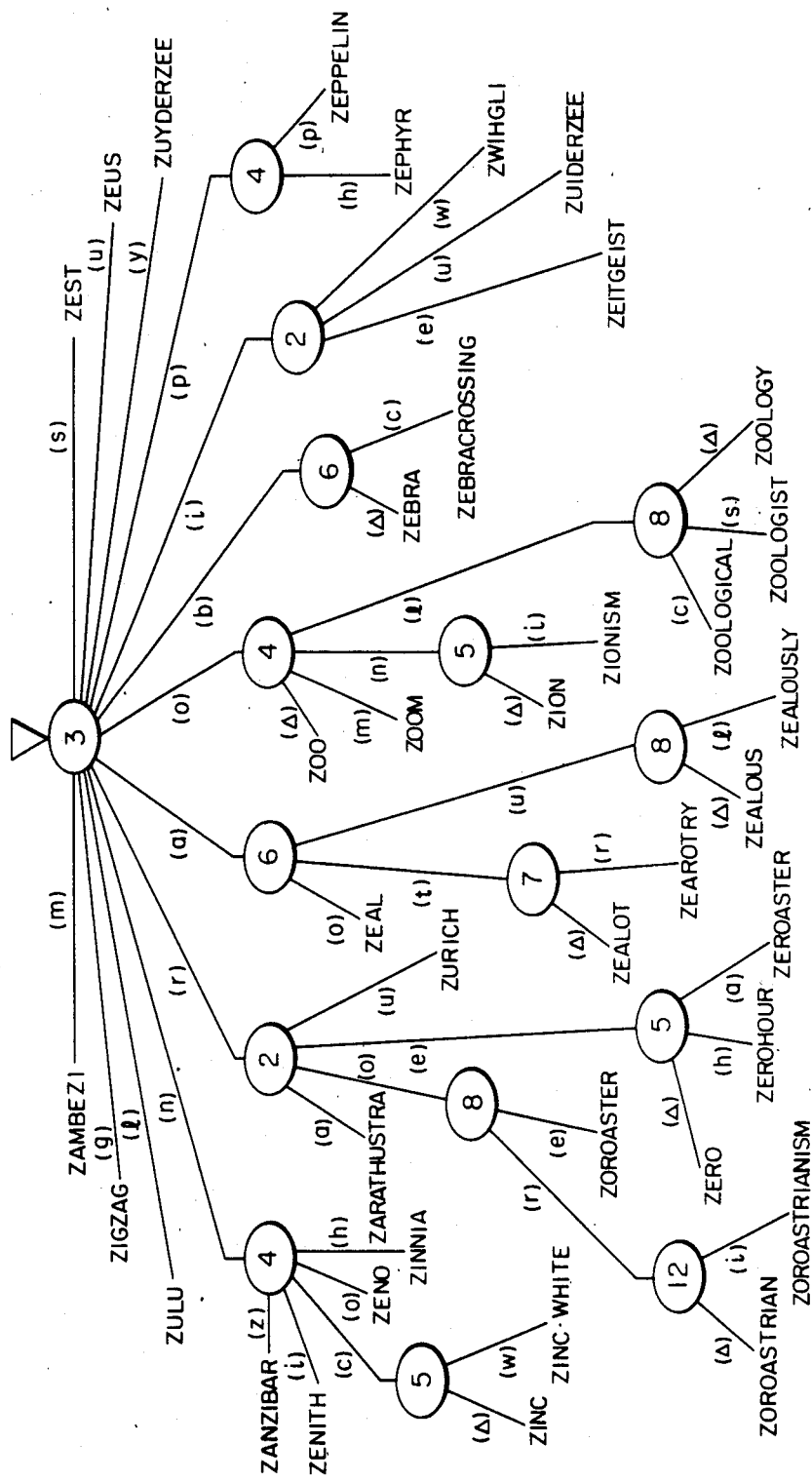
FIG. 16 shows an example of decision trees for identifying words on the basis of the maximum estimated depth.
Figure 17:
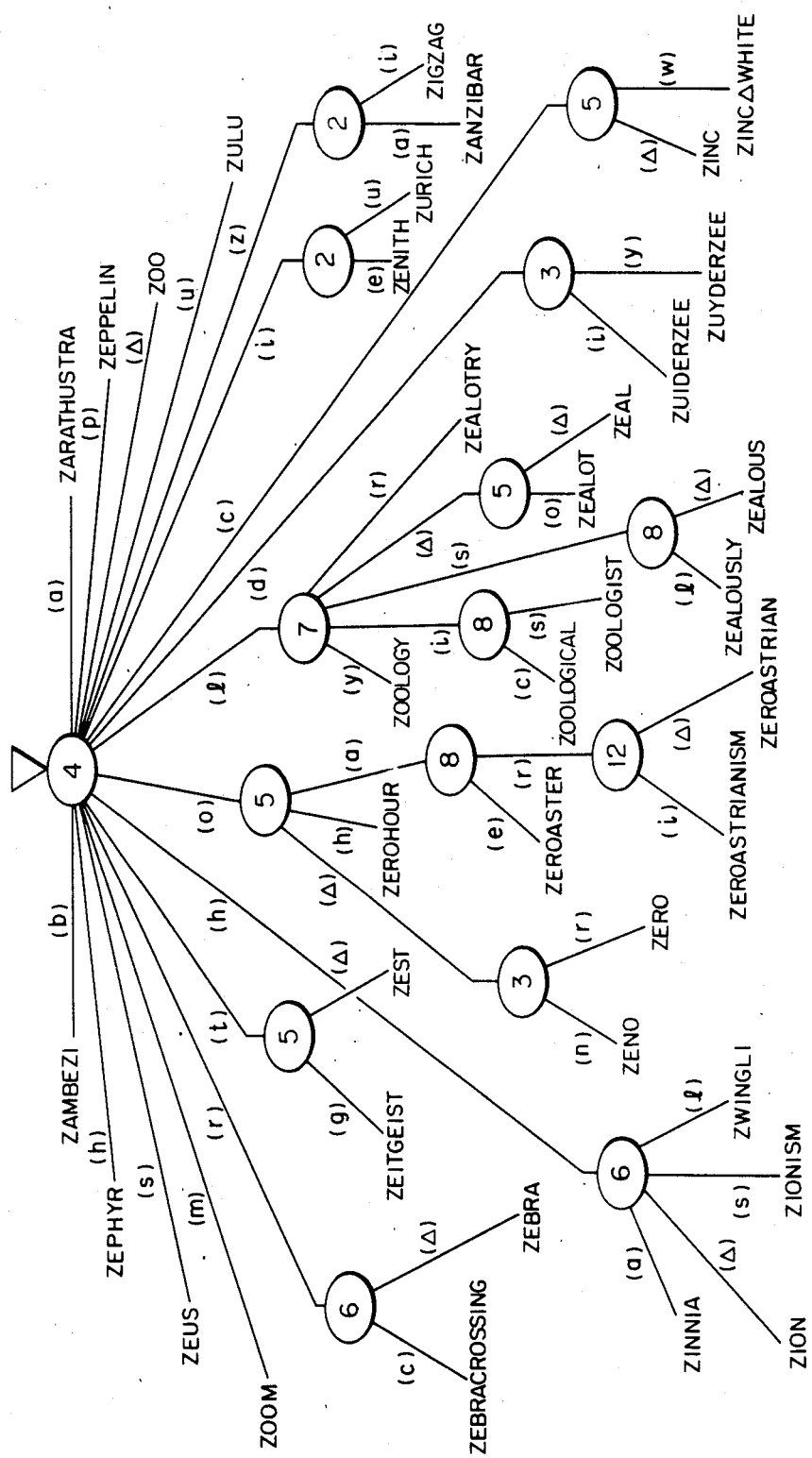
FIG. 17 shows an example of decision trees for identifying words on the basis of the sum of the estimated numbers of nodes.
Figure 18:
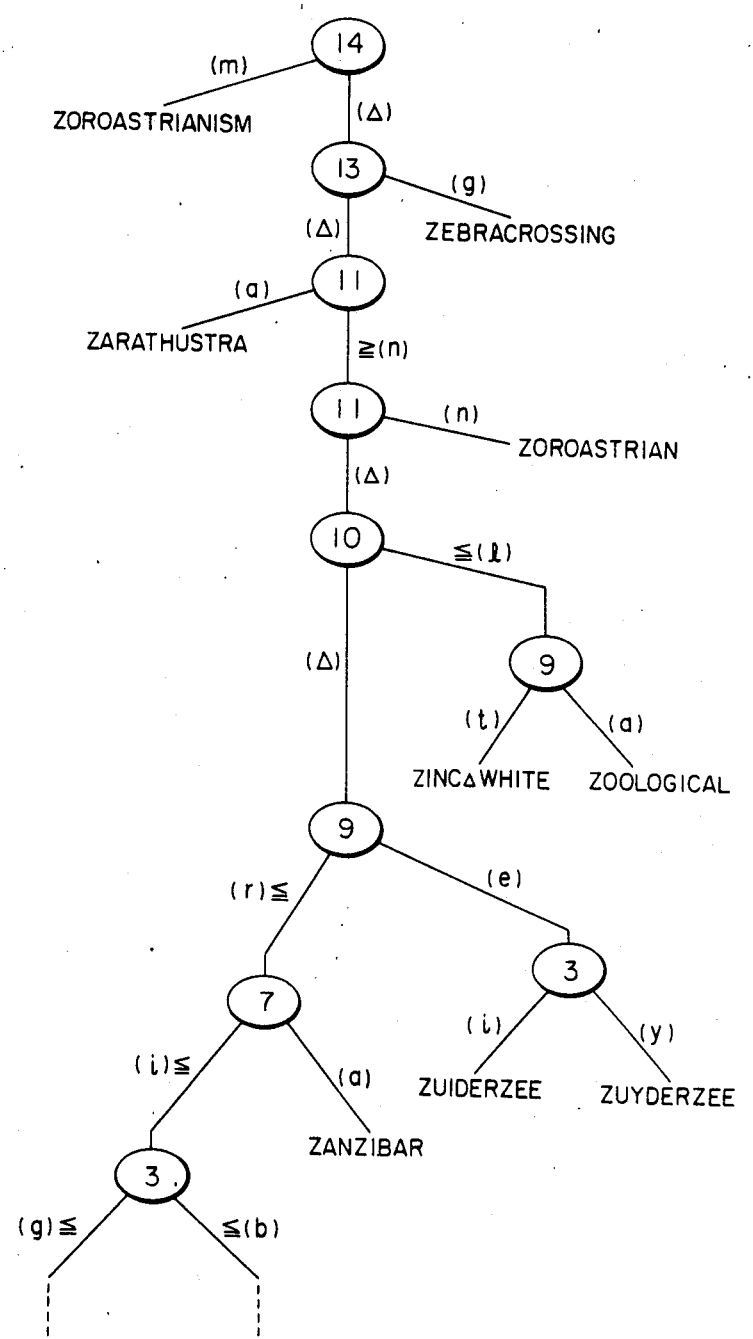
FIG. 18 shows an example of prior art decision trees for identifying words for explaining the effect of this invntion.

FIGS. 16 and 17 show respectively a decision tree for word recognition, similar to that indicated in FIG. 2, which is always classified by using letters for which the maximum estimated depth (here the maximum number of categories of lower rank) for FIG. 16 or the sum of estimated node numbers (here the square sum of the category numbers of lower rank) for FIG. 17 is the smallest. The objects to be recognized are all the words whose initial is z in an English-Japanese dictionary. FIG. 18 shows a higher rank part of a decision tree prepared by using the prior art separability method. For the calculation of the separability it is supposed that the letters have codes of increasing magnitude in the alphabetical order and that a blank has a code, which is greater by 1 than that for "z". (For example, a=0, b=1, ... z=25).

According to FIGS. 16–17, the maximum recognition time and the total recognition time for each figure represented by the number of extracted letters are as follows:

in the case of the maximum estimated depth (FIG. 16);
  maximum recognition time: 4,
  total recognition time: 91,
in the case of the sum of estimated node numbers (FIG. 17);
  maximum recognition time: 4,
  total recognition time: 81,
in the case of the prior art method (FIG. 18);
  maximum recognition time:
  greater than 7 and smaller than 14,
  total recognition time: greater than 227.

(It is supposed that among 38 words 38 letters are extracted for identifying each of the words and that all the remaining 27 letters can be identified by extracting 7 letters.)

Consequently, for this example, the maximum recognition time obtained by the method in the embodiments according to this invention is reduced to $\frac{1}{2}$-$\frac{1}{3}$ and the total recognition time approximately to $\frac{1}{3}$ with respect to the prior art method. When the number of features, which are objects to be selected, increases further, a more remarkable effect can be obtained in that the recognition time is further shortened with respect to the prior art.

We claim:
1. Method for preparing a recognition dictionary of decision tree structure, by which identification (classification) is effected, by the use of electronic data processing means while allocating each of a plurality of features prepared for objects to be recognized by recognition means to each of the nodes of a decision tree comprising
   (a) a step of estimating the maximum depth in representation of node level of the decision tree necessary for recognizing one of the objects to be recognized,
   (b) a step of estimating the sum of node numbers, which is the total sum of the depths in representation of node level of the decision tree necessary for recognizing all of the objects to be recognized, and
   (c) a step responsive to a requirement to said system of extracting (selecting) independently a feature, for which the maximum estimated depth according to said step (a) is the smallest, or a feature for which the sum of the estimated node numbers according to said step (b) is the smallest.

2. Method for preparing a recognition dictionary in a recognition system by a decision tree structure, by which identification (classification) is effected, by the use of an electronic data processing system while allocating each of a plurality of features prepared for objects to be recognized by recognition means connected with said system to each of nodes of a decision tree, comprising
   (a) a step of identifying the higher rank of the object to be recognized by carrying out once identification (classification) for each of the object to be recognized and each of the features,
   (b) a step of estimating the maximum depth and the sum of node numbers in representation of tree dependence relationships, which is the sum of the depths, the decision tree for the classified lower rank objects to be recognized after said identification of the higher rank,
   (c) a step of responding to a requirement to said system of extracting independently a feature for which either the maximum depth or the sum of node numbers of the decision tree for said lower rank objects to be recognized obtained in the step (b) is the smallest, emong said features; and (d) a step of allocating the feature obtained in the step (c) to the first node of the decision tree.

3. System for preparing a recognition dictionary of decison tree structure, by which identification (classification) is effected, by the use of electronic data processing means while allocating each of a plurality of features prepared for objects to be recognized by recognition means to each of the nodes of a decision tree, comprising:

(a) means for determining the maximum depth in representation of node level of the decision tree necessary for recognizing one of the objects to be recognized, (b) means for determining the total number of nodes, which is the sum of the depths in representation of node level of the decision tree necessary for recognizing all of the objects to be recognized, and (c) means responsive to a requirement to the system for selecting independently a feature, for which the maximum estimated depth according to said maximum depth determining means is the smallest, for a feature for which the sum of the estimated node numbers according to said total number of nodes determining means is the smallest.

4. System for preparing a recognition dictionary according to claim 3, wherein said objects to be recognized are bodies of various forms and the features include area, length of periphery, form factor, and average shade, of the bodies.

5. System for preparing a recognition dictionary according to claim 3, wherein said objects to be recognized are a set of letters including alphanumerics, and the features include area, length of periphery, form factor, and average shade of the letters.

6. System for preparing a recognition dictionary according to claim 3, wherein said maximum estimated depth is $$\max_{1 \leq i \leq K} \{N_i\},$$

$\{N_1, N_2, \ldots, N_K\}$ being the number of categories of the objects to be recognized.

7. System for preparing a recognition dictionary according to claim 3, wherein said sum of estimated node numbers is $$\sum_{i=1}^{K} \{N_i^2\},$$

$\{N_1, N_2, \ldots, N_K\}$ being the number of catergories of the objects to be recognized.

* * * * *